W. D. C. DODGE.
GREASE CUP.
APPLICATION FILED JULY 24, 1918.
1,305,527.
Patented June 3, 1919.
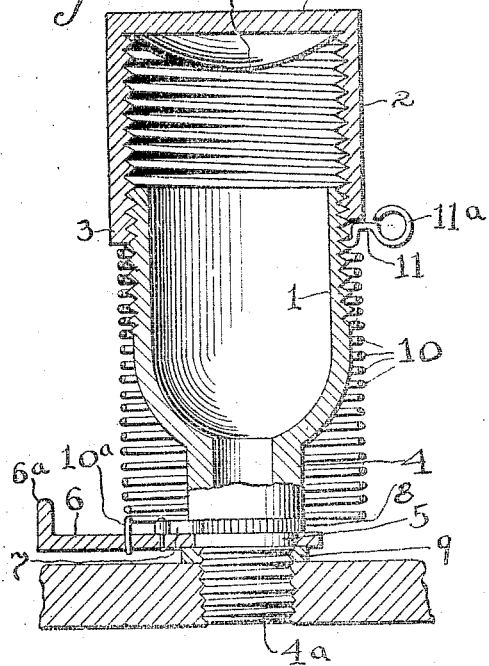
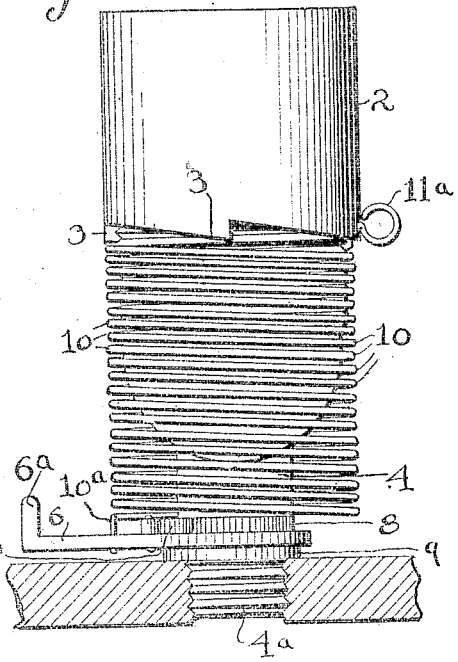
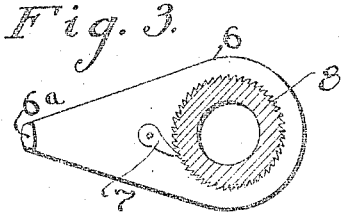
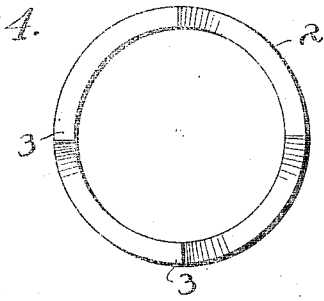
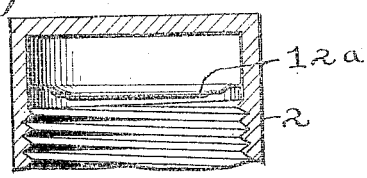
INVENTOR
W. D. C. DODGE.
By H. S. Hill
ATTORNEY

UNITED STATES PATENT OFFICE.

WALLACE D. C. DODGE, OF HAMPTON FALLS, NEW HAMPSHIRE.

GREASE-CUP.

1,305,527.　　　　　Specification of Letters Patent.　　Patented June 3, 1919.

Application filed July 24, 1918. Serial No. 246,579.

*To all whom it may concern:*

Be it known that I, WALLACE D. C. DODGE, a citizen of the United States, residing at Hampton Falls, in the county of Rockingham, State of New Hampshire, have invented a new and useful Grease-Cup; and I do hereby declare the following to be a full, clear, and exact description of the invention, such as will enable others skilled in the art to which it appertains to make and use the same.

The present invention relates to certain new and useful improvements in grease cups, and has for its object to provide a device of this character which embodies novel features of construction whereby the threaded cap is locked against backward movement, and which provides for automatically feeding the lubricant to the bearing as required.

Further objects of the invention are to provide a grease cup which is comparatively simple and inexpensive in its construction, which can be applied to a bearing and used in substantially the same manner as an ordinary grease cup, which admits of the threaded cap being readily removed for the purpose of refilling the same with lubricant, and which provides resilient means for screwing the cap down upon the grease cup to force the grease into the bearing as desired.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a vertical sectional view through a grease cup constructed in accordance with the invention, the lower portion of the stem appearing in side elevation.

Fig. 2 is a side elevation of the grease cup.

Fig. 3 is a top plan view of the ratchet plate, the stem and ratchet teeth of the grease cup appearing in section.

Fig. 4 is a bottom plan view of the threaded cap of the grease cup.

Fig. 5 is a sectional view through the upper end of the threaded cap, showing a slight modification.

Corresponding and like parts are referred to in the following description and indicated in all the views of the drawings by the same reference characters.

Referring to the drawings, which illustrate one embodiment of the invention, the numeral 1 designates the body of the grease cup which is exteriorly threaded to receive the interiorly threaded cap 2, the latter being removable so that it can be readily refilled with grease whenever necessary, and having the edges of the open end thereof provided with bevel teeth 3. The stem 4 of the cup has a reduced end $4^a$ which is exteriorly threaded so as to be screwed into the bearing in the usual manner. Immediately above the reduced end $4^a$ of the stem a bearing 5 is provided upon which a ratchet plate 6 is mounted, said ratchet plate being provided with a pawl 7 which engages an annular series of ratchet teeth 8 on the outside of the stem 4 to lock the ratchet plate against rotation in one direction. This ratchet plate 6 is removable over the threaded end $4^a$ of the stem 4, although it is normally confined in position between a shoulder just above the bearing 5 and a retaining nut 9 threaded upon the stem.

A coil spring 10 loosely surrounds the grease cup 1 and has the lower end thereof secured at $10^a$ to the ratchet plate 6, while the upper end thereof terminates in a laterally projecting arm 11 which has a finger piece $11^a$ at the end thereof. This arm 11 normally engages the square side of one of the bevel teeth 3 of the cap 2, and the arrangement of the spring is such that any tension therein then tends to screw the cap down on the cup and feed the grease through the tubular stem of the cup to the bearing. By grasping the finger piece $6^a$ at the end of the ratchet plate 6 the latter can be rotated upon the stem to increase the tension of the spring 10 to any desired extent, the pawl 7 slipping over the ratchet teeth 8 when the plate is thus rotated, and engaging the said ratchet teeth to prevent backward rotation of the plate when released. The tension thus produced in the spring 10 will tend to automatically turn the cap 2 in such a manner as to expel the grease from the cup. The engagement of the lateral arm 11 at the upper end of the coil spring with the bevel teeth 3 of the cap also locks the cap against backward rotation so that it is impossible for the cap to become disengaged from the cup and lost. However, when it is desired to remove the cap for the purpose of refilling the same with grease or lubricant, it is merely necessary to grasp the finger piece 11ª and force the same downwardly to disengage the arm 11 of the spring from the teeth 3 of the cap. The bevel formation of the teeth 3 admits of the cap being readily screwed into position, and after the ratchet plate 6 has then been rotated to place the spring 10 under tension, the jarring and vibration of the machine to which the grease cup is applied will cause the cap to rotate slowly under the action of the spring and feed the grease or lubricant to the bearing as required.

A very thin diaphragm 12 is provided in the base of the cap 2, said diaphragm inclosing an air chamber A and being sufficiently sensitive to admit of the air in this chamber being compressed when the grease cup is under the action of the coil spring 10. The internal pressure produced by this compressed air will tend to continue the feeding of the lubricant after the action of the spring has ceased, and will otherwise promote the effective automatic feeding of the lubricant in the required manner. In Fig. 5 the diaphragm 12ª is slightly different in formation, and this construction of diaphragm would perhaps be a trifle more sensitive than that shown by Fig. 1, although the purpose and manner of operation of the diaphragm is exactly the same.

Having thus described the invention, what I claim as new and desire to secure by Letters Patent, is:—

1. A grease cup including a cup body, a cap threaded on the body, and a spring engaging the cap and tending to screw the same on the body to feed the grease.

2. A grease cup including a cup body, a cap threaded on the body, a spring engaging the cap and tending to screw the same on the body to feed the grease, and means for regulating the tension of the spring.

3. A grease cup including a cup body, a cap threaded on the body, a coil spring surrounding the body and engaging the cap, the tension of the spring tending to screw the cap on the body to feed the grease.

4. A grease cup including a cup body, a cap threaded on the body, a coil spring surrounding the body and engaging the cap, and a rotatable plate carried by the body and also engaging the spring to regulate the tension thereof, the tension of the spring tending to screw the cap on the body.

5. A grease cup including a cup body, a cap threaded on the body, a coil spring surrounding the body and having one end thereof in engagement with the cap, a rotatable plate carried by the body and engaging the other end of the spring, said plate being adapted to be rotated to place the spring under tension, and a pawl and ratchet construction for preventing backward rotation of the plate, the tension of the spring tending to screw the cap on the body.

6. A grease cup including a cup body formed with a tubular stem having a bearing portion thereon, a cap threaded upon the body, a ratchet plate rotatable on the bearing portion of the stem, a pawl and ratchet connection between the ratchet plate and the stem, and a coil spring surrounding the cup body and having one end thereof in engagement with the cap while the other end thereof is in engagement with the ratchet plate, the tension of the spring tending to screw the cap on the body.

7. A grease cup including a cup body, a cap threaded on the body, a spring engaging the cap and tending to screw the same on the body, and a diaphragm arranged within the cap and providing an air chamber therein.

8. A grease cup including a cup body, a cap threaded on the body, and a diaphragm extending across the cap and providing an air chamber therein.

In testimony whereof I have signed my name to this specification in the presence of two subscribing witnesses.

WALLACE D. C. DODGE.

Witnesses:
 ELSIE I. BUSWELL,
 PERLEY GARDNER.

Copies of this patent may be obtained for five cents each, by addressing the "Commissioner of Patents, Washington, D. C."